United States Patent
Koike

(10) Patent No.: US 9,279,928 B2
(45) Date of Patent: Mar. 8, 2016

(54) RETARDATION ELEMENT COMPRISING A BIREFRINGENT MULTILAYER STRUCTURE, LIQUID CRYSTAL DISPLAY DEVICE, AND PROJECTION DISPLAY DEVICE

(71) Applicant: DEXERIALS CORPORATION, Tokyo (JP)

(72) Inventor: Nobuyuki Koike, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/519,450

(22) Filed: Oct. 21, 2014

(65) Prior Publication Data
US 2015/0109557 A1 Apr. 23, 2015

(30) Foreign Application Priority Data
Oct. 23, 2013 (JP) ................................. 2013-220110

(51) Int. Cl.
*G02F 1/1335* (2006.01)
*G02B 5/30* (2006.01)
*G02F 1/13363* (2006.01)

(52) U.S. Cl.
CPC .. *G02B 5/3083* (2013.01); *G02F 2001/133638* (2013.01)

(58) Field of Classification Search
CPC ............. G02F 1/133634; G02F 2001/133638; G02B 5/3083
USPC .................................. 349/117–121
See application file for complete search history.

(56) References Cited

U.S. PATENT DOCUMENTS

| 6,206,065 B1 | 3/2001 | Robbie et al. |
| 2007/0076133 A1 | 4/2007 | Shimizu et al. |

(Continued)

FOREIGN PATENT DOCUMENTS

| JP | 2004-354935 A | 12/2004 |
| JP | 2005-172984 A | 6/2005 |

(Continued)

OTHER PUBLICATIONS

Tomoyoshi Motohiro and Y. Taga, "Thin film retardation plate by oblique deposition", Applied Optics, Jul. 1, 1989, pp. 2466 to 2482, vol. 28—issue No. 13, Optical Society of America.

*Primary Examiner* — Paul Lee
(74) *Attorney, Agent, or Firm* — Pergament & Cepeda LLP; Milagros A. Cepeda; Edward D. Pergament

(57) ABSTRACT

Provided is a retardation element, including: a transparent substrate; and a birefringent multilayer structure formed of layered structures stacked over the transparent substrate and each formed of first and second birefringent layers. In each layered structure, a relationship between average thicknesses (t1) and (t2) of the first and second birefringent layers satisfies any of formulae (1) and (2) below, and an angle ($\beta$) formed between first and second line segments representing principal axes of refractive index anisotropy of the first and second birefringent layers satisfies formula (3) below when the first and second line segments are projected on the transparent substrate such that an end A of the first line segment and an end B of the second line segment at a side of the transparent substrate coincide with each other, and condition (4) is satisfied, $0 < t1/t2 \leq 1$  formula (1)
$0 < t2/t1 \leq 1$  formula (2)
$90° < \beta \leq 180°$  formula (3)
$t1 \neq t2$ or $\beta \neq 180°$  condition (4).

10 Claims, 12 Drawing Sheets

Optical axis of whole retardation element

(56) References Cited

U.S. PATENT DOCUMENTS

| | | | |
|---|---|---|---|
| 2008/0049178 A1* | 2/2008 | Kisara | G02F 1/1395 349/118 |
| 2009/0135316 A1 | 5/2009 | Horikoshi | |
| 2009/0213313 A1* | 8/2009 | Iwamoto | G02F 1/133634 349/118 |
| 2012/0081622 A1 | 4/2012 | Horikoshi et al. | |
| 2012/0099033 A1* | 4/2012 | Ishiguro | G02B 27/2264 349/15 |
| 2012/0200811 A1* | 8/2012 | Sakai | G02F 1/13363 349/102 |

FOREIGN PATENT DOCUMENTS

| | | |
|---|---|---|
| JP | 2007-101764 A | 4/2007 |
| JP | 2009-133917 A | 6/2009 |
| JP | 2009-229804 A | 10/2009 |
| JP | 4566275 B2 | 8/2010 |
| JP | 2012-078436 A | 4/2012 |

* cited by examiner

Optical axis of whole retardation element

Optical axis of whole retardation element

Optical axis of whole retardation element

RETARDATION ELEMENT COMPRISING A BIREFRINGENT MULTILAYER STRUCTURE, LIQUID CRYSTAL DISPLAY DEVICE, AND PROJECTION DISPLAY DEVICE

CROSS-REFERENCE TO RELATED APPLICATION

This application claims priority to Japanese Patent Application No. 2013-220110, filed Oct. 23, 2013, the entire contents of which are incorporated herein by reference.

BACKGROUND OF THE INVENTION

1. Field of the Invention

The present invention relates to a retardation element, a liquid crystal display device, and a projection display device.

2. Description of the Related Art

In recent years, an optical compensation technique utilizing a retardation element has been applied to projection display devices in order to improve a contrast property and a viewing angle property. Examples include black luminance correction in a vertically aligned liquid crystal. In order to correct polarization disturbance due to a pretilt angle of a liquid crystal, birefringence of oblique incident light, or the like, there are considered a method of performing optical compensation by placing a retardation element made of crystal or the like in parallel with a surface of a liquid crystal panel, and a method of performing optical compensation by placing an organic material having a birefringence such as a polymer film in parallel with a surface of a liquid crystal panel (see Japanese Patent Application Laid-Open (JP-A) Nos. 2005-172984 and 2007-101764, and Japanese Patent (JP-B) No. 4566275).

However, in a method of machining a monocrystal as a retardation element, in particular, with a view to performing compensation taking into account even a pretilt angle of a liquid crystal, it is necessary to cut out the monocrystal at a predetermined angle from the crystal axis. This necessitates a very high level precision in cutting, polishing, etc. of the material, and high costs are required to realize such a precision. Furthermore, axis control is not easy with a stretched film or the like.

Hence, there is considered a method of placing a retardation element itself to be inclined from a liquid crystal panel (see JP-A No. 2009-229804). However, there is a risk of shortage of space needed for the inclination in projectors that are becoming increasingly smaller in size. Furthermore, there is a problem in durability, with susceptibility to deterioration due to heat and UV rays.

Further, in projection display devices, a ½ wave plate is used as part of a polarization conversion element. For example, there is proposed a technique of cutting a crystal for a ½ wave plate from an angle such that an optical axis of the wave plate may not be parallel with a substrate surface but may be inclined therefrom, and sticking two such inclined crystal wave plates together, to thereby widen a wavelength range and suppress incident angle dependency (see JP-A Nos. 2004-354935, 2009-133917, and 2012-078436). However, a crystal substrate that is expensive may require a greater expense when it needs to be cut out to have an inclined optical axis.

As described above, there have been increasing needs for inclining the optical axis from a direction normal to a substrate or from an in-plane direction, but there have been technical and cost problems.

Meanwhile, an obliquely deposited retardation element excellent in light resistance and heat resistance is an element that is, in the first place, produced to have an inclined optical axis. However, the problem is the directional limitation of the optical axis. A detailed explanation will be provided below. A common oblique deposition procedure can make deposition particles incident to the substrate from an oblique direction and produce film density anisotropy by a so-called self-shadowing effect. The density anisotropy can produce anisotropy in the refractive index of the film in the in-plane direction of the substrate, which forms a factor for birefringence to occur. Here, it is possible to impart a relatively arbitrary retardation to light that is incident from a direction normal to the substrate, based on the film thickness. In oblique deposition, the growth angle of deposition particles is determined by the angle of the oblique deposition, and the optical axis is determined by the direction of the deposition particles. In order to change the optical axis, i.e., the growth direction of the deposition particles, it is necessary to change the incident angle of the oblique deposition, whereas when the incident angle is reduced, birefringence is reduced. Therefore, there is a problem of difficulty producing a retardation element having an optical axis which has a small inclination angle (i.e., which is close to the direction normal to the substrate) (see APPLIED OPTICS/Vol. 28, No. 13/1 July 1989).

There is also proposed a technique of alternately performing a step of performing oblique deposition while rotating a substrate, and a step of performing oblique deposition from a specific direction while stopping the rotation (see U.S. Pat. No. 6,206,065). However, this proposed technique needs to perform oblique deposition while rotating a substrate. Therefore, there is a problem that the production apparatus is complicated.

Hence, it is currently requested to provide a retardation element that can be produced with a simple production apparatus, of which optical axis and retardation are adjustable easily, and that is excellent in heat resistance and durability, and a liquid crystal display device, and a projection display device

SUMMARY OF THE INVENTION

The present invention aims to solve the conventional problems described above, and achieve the following object. That is, an object of the present invention is to provide a retardation element that can be produced with a simple production apparatus, of which optical axis and retardation are adjustable easily, and that is excellent in heat resistance and durability, a production method of the same, a liquid crystal display device, and a projection display device.

Means for solving the problems described above is as follows, for example.

In one aspect, the present invention provides a retardation element, including:
  a transparent substrate; and
  a birefringent multilayer structure formed of a plurality of layered structures stacked over the transparent substrate and each formed of a first birefringent layer containing an optically anisotropic inorganic material and a second birefringent layer containing an optically anisotropic inorganic material and contacting the first birefringent layer,
  wherein in at least one of the layered structures, a relationship between an average thickness (t1) of the first birefringent layer and an average thickness (t2) of the second birefringent layer satisfies any of the formulae (1) and (2) below, wherein in the at least one of the layered structures, an angle (β) formed between a first line segment representing a principal axis of refractive index anisotropy of the first birefringent layer and a second line segment representing a principal axis of refractive index anisotropy of the second birefringent layer satisfies the formula (3) below when the first line segment and the second line segment are projected on the transparent substrate such that an end A of the first line segment at a side of the transparent substrate and an end B of the second line segment at a side of the transparent substrate coincide with each other, and wherein the at least one of the layered structures satisfies the condition (4) below, $$0 < t1/t2 \leq 1 \qquad \text{formula (1)}$$

$$0 < t2/t1 \leq 1 \qquad \text{formula (2)}$$

$$90° < \beta \leq 180° \qquad \text{formula (3)}$$

$$t1 \neq t2 \text{ or } \beta \neq 180° \qquad \text{condition (4)}.$$

In one variant, the present invention provides a retardation element according to the present invention,
wherein the retardation element has birefringence of 0.1 or greater in a direction perpendicular to a surface of the transparent substrate.

In one variant, the present invention provides a retardation element according to the present invention,
wherein the retardation element is a biaxial retardation element, and
wherein a direction of an optical axis of the retardation element is inclined from a direction perpendicular to a surface of the transparent substrate to a direction x in which a direction of a principal axis of refractive index anisotropy of the birefringent multilayer structure is represented when an index ellipsoid approximated by the birefringent multilayer structure is projected on the transparent substrate, or to a direction y perpendicular to the direction x over the transparent substrate, or to the direction x and the direction y.

In one variant, the present invention provides a retardation element according to the present invention,
wherein the first birefringent layer, or the second birefringent layer, or both thereof satisfy the following formula: Nx>Ny>Nz, where Nx represents a refractive index in a direction parallel with the principal axis of refractive index anisotropy, Ny represents a refractive index in a direction perpendicular to Nx, and Nz represents a refractive index in a direction perpendicular to Nx and Ny.

In one variant, the present invention provides a retardation element according to the present invention,
wherein an index ellipsoid approximated by the birefringent multilayer structure satisfies the following formula: Nax>Nay>Naz, where Nax represents a refractive index of the index ellipsoid approximated by the birefringent multilayer structure in a direction parallel with a principal axis of refractive index anisotropy thereof, Nay represents a refractive index thereof in a direction perpendicular to Nax, and Naz represents a refractive index thereof in a direction perpendicular to Nax and Nay.

In one variant, the present invention provides a retardation element according to the present invention,
wherein the at least one of the layered structures has an average thickness of 30 nm or less.

In one variant, the present invention provides a retardation element according to the present invention,
wherein the optically anisotropic inorganic material of the first birefringent layer is an oxide containing at least Si, Nb, Zr, Ti, La, Ta, or Al, or any combination thereof, and
wherein the optically anisotropic inorganic material of the second birefringent layer is an oxide containing at least Si, Nb, Zr, Ti, La, Ta, or Al, or any combination thereof.

In one aspect, the present invention provides a liquid crystal display device, including:
a liquid crystal panel; and
the retardation element according to the present invention.

In one aspect, the present invention provides a projection display device, including:
a light source configured to emit light;
a projection optical system configured to project modulated light; and
the liquid crystal display device according to the present invention disposed on an optical path between the light source and the projection optical system.

In another aspect, the present invention provides a retardation element production method for producing the retardation element according to the present invention, including:
a first birefringent layer forming step of forming the first birefringent layer over the transparent substrate by oblique deposition; and
a second birefringent layer forming step of forming the second birefringent layer over the first birefringent layer by oblique deposition.

The present invention can solve the conventional problems described above, achieve the object described above, and provide a retardation element that can be produced with a simple production apparatus, of which optical axis and retardation are adjustable easily, and that is excellent in heat resistance and durability, a production method of the same, a liquid crystal display device, and a projection display device.

Figure 1:
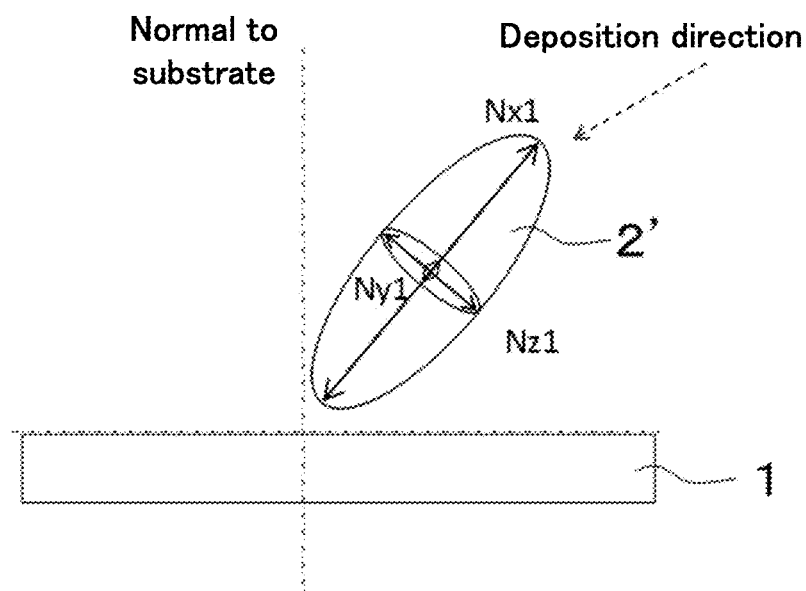
FIG. 1 is a schematic diagram of an index ellipsoid approximated by a birefringent layer formed by oblique deposition of a single layer.

DETAILED DESCRIPTION OF THE INVENTION (Retardation Element and Production Method Thereof)

A retardation element of the present invention includes at least a transparent substrate, and a birefringent multilayer structure, and further includes other members according to necessity.

A retardation element production method of the present invention is a method for producing the retardation element of the present invention, includes at least a first birefringent layer forming step and a second birefringent layer forming step, and further includes other steps according to necessity.

The first birefringent layer forming step is a step of forming a first birefringent layer over any of the transparent substrate and a retardation imparting antireflection layer by oblique deposition.

The second birefringent layer forming step is a step of forming a second birefringent layer over the first birefringent layer by oblique deposition.

Birefringence ($\Delta n$) of the retardation element is preferably 0.1 or greater, or more preferably from 0.1 to 0.4 in terms of suppressing thickening of a film thickness.

The retardation element is a biaxial retardation element. It is preferable that the direction of the optical axis of the retardation element be inclined from a direction perpendicular to a surface of the transparent substrate to a direction x in which a direction of a principal axis of refractive index anisotropy of the birefringent multilayer structure is represented when an index ellipsoid approximated by the birefringent multilayer structure is projected on the transparent substrate, or a direction y perpendicular to the direction x over the transparent substrate, or both thereof, and it is more preferable that it be inclined by 80° or less but greater than 0°. With such an inclination, the retardation element can perform suitable optical compensation of a retardation produced through an inclined index ellipsoid such as a pretilt angle of a liquid crystal.

In the following, through explanation of each member of the retardation element, the method for producing the retardation element of the present invention will also be explained.

(Transparent Substrate)

The transparent substrate is not particularly limited, and an arbitrary transparent substrate may be selected according to the purpose, as long as it has light transmissivity to light in a wavelength range to be used.

The material of the transparent substrate is not particularly limited, and may be appropriately selected according to the purpose. Examples thereof include glass, quartz, and crystal.

The shape of the transparent substrate is not particularly limited, and may be appropriately selected according to the purpose. However, it is preferably a quadrangle.

The average thickness of the transparent substrate is not particularly limited, and may be appropriately selected according to the purpose. However, it is preferably from 0.1 mm to 3.0 mm, and more preferably from 0.1 mm to 2.0 mm in terms of preventing warpage of the substrate.

The transparent substrate may have a minute pattern on the surface thereof. Such a minute pattern adds a structural birefringent effect to the birefringent multilayer structure that is formed by oblique deposition, and increases the amount of birefringence.

(Birefringent Multilayer Structure)

The birefringent multilayer structure is formed of a plurality of stacked layered structures each formed of a first birefringent layer and a second birefringent layer.

The number of layered structures stacked in the birefringent multilayer structure is not particularly limited and may be appropriately selected according to the purpose as long as it is 2 or greater. However, it is preferably from 10 to 5,000, and more preferably from 50 to 2,000. It is advantageous that the number of layered structures stacked is within the more preferable range, because in this case, it is possible to make the film thickness of each birefringent layer considerably smaller than the wavelength of light, which makes it possible to reduce light scattering due to an inclined structural portion of the multilayer structure.

It is preferable that an index ellipsoid approximated by the birefringent multilayer structure satisfy the following formula: Nax>Nay>Naz.

Nax represents a refractive index of the index ellipsoid approximated by the birefringent multilayer structure in a direction parallel with a principal axis of refractive index anisotropy of the index ellipsoid. Nay represents a refractive index thereof in a direction perpendicular to Nax. Naz represents a refractive index thereof in a direction perpendicular to Nax and Nay.

(Layered Structure)

Each layered structure is formed of the first birefringent layer and the second birefringent layer.

The average thickness of the layered structure is preferably 30 nm or less, and more preferably from 3 nm to 10 nm, in terms of reducing such light scattering as mentioned above.

——First Birefringent Layer and Second Birefringent Layer——

The first birefringent layer contains an optically anisotropic inorganic material.

The second birefringent layer contains an optically anisotropic inorganic material.

In the layered structure, a relationship between the average thickness (t1) of the first birefringent layer and the average thickness (t2) of the second birefringent layer satisfies any of the formula (1) and the formula (2) described below.

In the layered structure, an angle ($\beta$) formed between a first line segment representing a principal axis of refractive index anisotropy of the first birefringent layer and a second line segment representing a principal axis of refractive index anisotropy of the second birefringent layer (hereinafter may be referred to as "angle ($\beta$)") satisfies the formula (3) described below when the first line segment and the second line segment are projected on the transparent substrate such that an end A of the first line segment at a side of the transparent substrate and an end B of the second line segment at a side of the transparent substrate coincide with each other.

Further, the layered structure satisfies the condition (4) described below.

$$0 < t1/t2 \leq 1 \quad \text{formula (1)}$$

$$0 < t2/t1 \leq 1 \quad \text{formula (2)}$$

$$90° < \beta \leq 180° \quad \text{formula (3)}$$

$$t1 \neq t2 \text{ or } \beta \neq 180° \quad \text{condition (4)}$$

Further, it is preferable that the relationship between the average thickness (t1) and the average thickness (t2) satisfy any of the formula (1-1) and the formula (2-1) described below, because this makes it possible to maintain birefringence to a large value.

$$0.1 \leq t1/t2 \leq 1 \quad \text{formula (1-1)}$$

$$0.1 \leq t2/t1 \leq 1 \quad \text{formula (2-1)}$$

When the end A and the end B are made to coincide, the first line segment and the second line segment projected on the transparent substrate should be prevented from being rotated relative to the projection surface.

The angle formed between the first line segment and the second line segment typically can be either of two angles that total 360°. However, it means the smaller angle (minor angle), here.

It is preferable that the angle ($\beta$) satisfy the formula (3-1) described below, because this makes it possible to maintain birefringence to a large value.

$$160° < \beta \leq 180° \quad \text{formula (3-1)}$$

The average thickness of the first birefringent layer in each layered structure is not particularly limited and may be appropriately selected according to the purpose. However, it is preferably from 3 nm to 10 nm.

The average thickness of the second birefringent layer in each layered structure is not particularly limited and may be appropriately selected according to the purpose. However, it is preferably from 3 nm to 10 nm.

Here, "a principal axis of refractive index anisotropy" means a direction in which the birefringent layer has the highest refractive index.

When a common explanation is to be made on the first birefringent layer and the second birefringent layer, the first birefringent layer and the second birefringent layer may be referred to as birefringent layer without distinction.

The thickness of the birefringent layer can be measured by, for example, observation of a cross-section of the birefringent layer with a scanning electron microscope (SEM). The average thickness can be obtained by measuring the thickness at 10 positions, and arithmetically averaging the measurements.

In the retardation element, it is only necessary that at least one layered structure of the plurality of layered structures of the birefringent multilayer structure satisfy the formula (1) or the formula (2), the formula (3), and the condition (4), and it is preferable that all of the layered structures satisfy the formula (1) or the formula (2), the formula (3), and the condition (4).

The values t1/t2, t2/t1, and $\beta$ may be unified or varied in the plurality of layered structures of the birefringent multilayer structure. In other words, the plurality of layered structures may:

have equal t1/t2, t2/t1, and $\beta$ values;

have equal t1/t2 and t2/t1 values and different $\beta$ values;

have an equal $\beta$ value, and different t1/t2 and t2/t1 values; or have different t1/t2, t2/t1, and $\beta$ values.

In the first birefringent layer, an angle formed between the principal axis of refractive index anisotropy of the optically anisotropic inorganic material and a surface of the transparent substrate is preferably not 90°, preferably from 20° to 80°, and more preferably from 40° to 70°.

In the second birefringent layer, an angle formed between a principal axis of refractive index anisotropy of the optically anisotropic inorganic material and a surface of the transparent substrate is preferably not 90°, preferably from 20° to 80°, and more preferably from 40° to 70°.

The angle formed between the principal axis and the surface of the transparent substrate typically can be either of two angles that total 180°. However, it means the angle smaller than 90°, here.

The angle formed between the principal axis of refractive index anisotropy of the optically anisotropic inorganic material of the first birefringent layer and the surface of the transparent substrate, and the angle formed between the principal axis of refractive index anisotropy of the optically anisotropic inorganic material of the second birefringent layer and the surface of the transparent substrate are not particularly limited and may be appropriately selected according to the purpose. However, it is preferable that they be approximately the same angle. When it is said that they are approximately the same angle here, it means that they are different by within ±5°.

The optically anisotropic inorganic material of the first birefringent layer is not particularly limited, and an arbitrary optically anisotropic inorganic material may be selected according to the purpose. However, it is preferably an oxide containing Si, Nb, Zr, Ti, La, Ta, or Al, or any combination thereof.

The optically anisotropic inorganic material of the second birefringent layer is not particularly limited, and an arbitrary optically anisotropic inorganic material may be selected according to the purpose. However, it is preferably an oxide containing Si, Nb, Zr, Ti, La, Ta, or Al, or any combination thereof.

It is preferably that the first birefringent layer, the second birefringent layer, or both satisfy the following formula: $Nx > Ny > Nz$.

Nx represents a refractive index in a direction parallel with the principal axis of refractive index anisotropy. Ny represents a refractive index in a direction perpendicular to Nx. Nz represents a refractive index in a direction perpendicular to Nx and Ny.

The first birefringent layer and the second birefringent layer can be formed by, for example, oblique deposition.

For example, in oblique deposition, particles of a high refractive index material are incident to the transparent substrate from an oblique direction. Examples of the high refractive index material include oxides such as $Ta_2O_5$, $TiO_2$, $SiO_2$, $Al_2O_3$, $CeO_2$, $ZrO_2$, ZrO, and $Nb_2O_5$, or a combination of these. A material mainly composed of $Ta_2O_5$ is preferable.

After the oblique deposition, it is preferable to perform an annealing treatment in order to strip colors and vaporize moisture adsorbed between columnar structures. When moisture is adsorbed between columnar structures, the refractive index of the deposited film may change to alter the characteristics greatly. Therefore, the temperature for the annealing treatment is preferably 100° C. or higher at which moisture can vaporize. Further, when the temperature is too high, the columnar structures may grow to form a column-like shape together, which may degrade the birefringence, the transmissivity, etc. Therefore, the temperature is preferably 300° C. or lower.

(Other Members)

Examples of the other members include a stress adjusting layer, and an antireflection layer.

(Stress Adjusting Layer)

The stress adjusting layer is not particularly limited, and an arbitrary stress adjusting layer may be selected according to the purpose as long as it is a layer deposited to prevent warpage of the retardation element and configured to adjust a stress. Examples of the material thereof include $SiO_2$.

(Liquid Crystal Display Device)

The liquid crystal display device of the present invention includes at least a liquid crystal panel and the retardation element of the present invention, and further includes other members according to necessity.

(Liquid Crystal Panel)

The liquid crystal panel is not particularly limited, and an arbitrary liquid crystal panel may be selected according to the purpose. Examples thereof include a VA mode liquid crystal panel.

The VA mode (vertical alignment mode) means a mode of moving liquid crystal molecules aligned perpendicularly to the substrate (or aligned to have a pretilt), by using a longitudinal electric field in the perpendicular direction.

(Retardation Element)

The retardation element is the retardation element of the present invention.

(Other Members)

Examples of the other members include a polarizer.

The polarizer is not particularly limited, and an arbitrary polarizer may be selected according to the purpose. However, it is preferably an inorganic polarizer in terms of durability. Examples of the inorganic polarizer include a polarizer obtained by depositing inorganic particles (a semiconductor or a metal) having a size shorter than the wavelength range used and having a shape anisotropy over a substrate (a glass substrate) transparent of light in the wavelength range used, by a vacuum deposition method such as sputtering and vacuum vapor deposition.

(Projection Display Device)

A projection display device of the present invention includes at least a light source, a projection optical system, and the liquid crystal display device of the present invention, and further includes other members according to necessity.

(Light Source)

The light source is not particularly limited, and an arbitrary light source may be selected according to the purpose as long as it is a member that emits light. Examples thereof include an extra high pressure mercury lamp that emits white light.

(Projection Optical System)

The projection optical system is not particularly limited, and an arbitrary projection optical system may be selected according to the purpose, as long as it is a member that projects modulated light. Examples thereof include a projection lens that projects modulated light onto a screen.

(Liquid Crystal Display Device)

The liquid crystal display device is disposed on an optical path between the light source and the projection optical system.

An example of the retardation element of the present invention will be explained together with an example of a production process.

[1] (a) A first birefringent layer is formed over a transparent substrate by oblique deposition. Next, (b) a second birefringent layer is formed by oblique deposition performed from an opposite angular position that is shifted by 180° in the in-plane direction of the transparent substrate from the principal axis of refractive index anisotropy of the first birefringent layer. In this case, the first birefringent layer and the second birefringent layer are formed to have an average thickness (t1) and an average thickness (t2) that are different from each other (t1/t2≠1). Further, both of the birefringent layers are formed to have an average thickness that is sufficiently smaller than a wavelength range for which they are to be used as the retardation element. The average thickness is preferably λ/4 or less, and more preferably λ/10 or less. Deposition is performed up to a total thickness with which a necessary retardation can be obtained, through repetition of the process (a) and the process (b), to thereby form a multilayer structure having a desired retardation.

[2] (c) A first birefringent layer is formed over the transparent substrate by oblique deposition. Next, (d) a second birefringent layer is formed by oblique deposition performed from another angular position that is shifted by greater than 90° but less than 180° in the in-plane direction of the transparent substrate from the principal axis of refractive index anisotropy of the first birefringent layer. In this case, the first birefringent layer and the second birefringent layer are formed to have an average thickness (t1) and an average thickness (t2) that are equal to each other (t1=t2). Further, the birefringent layers are formed to have an average thickness that is sufficiently smaller than a wavelength range for which they are to be used as the retardation element. Deposition is performed up to a total thickness with which a necessary retardation can be obtained, through repetition of the process (c) and the process (d), to thereby form a multilayer structure having a desired retardation.

Through the above-described [1] or [2] alone or both in combination, a retardation element in which the growth directions of the deposited particles are controlled while birefringence is kept large, and which thereby has a desired optical axis and a desired retardation is obtained.

FIG. 1 is a schematic diagram of an index ellipsoid 2' approximated by a birefringent layer formed by oblique deposition of one layer. Generally, the direction in which the largest refractive index is obtained is a direction parallel with the direction of deposition (this refractive index will hereinafter be referred to as Nx).

There is typically a relationship of Nx>Ny>Nz among Nx, Ny which is a refractive index in a direction perpendicular to the direction of deposition, and Nz is a refractive index in a direction perpendicular to both of Nx and Ny. In FIG. 1, the reference sign 1 denotes the transparent substrate.

Figure 2A:
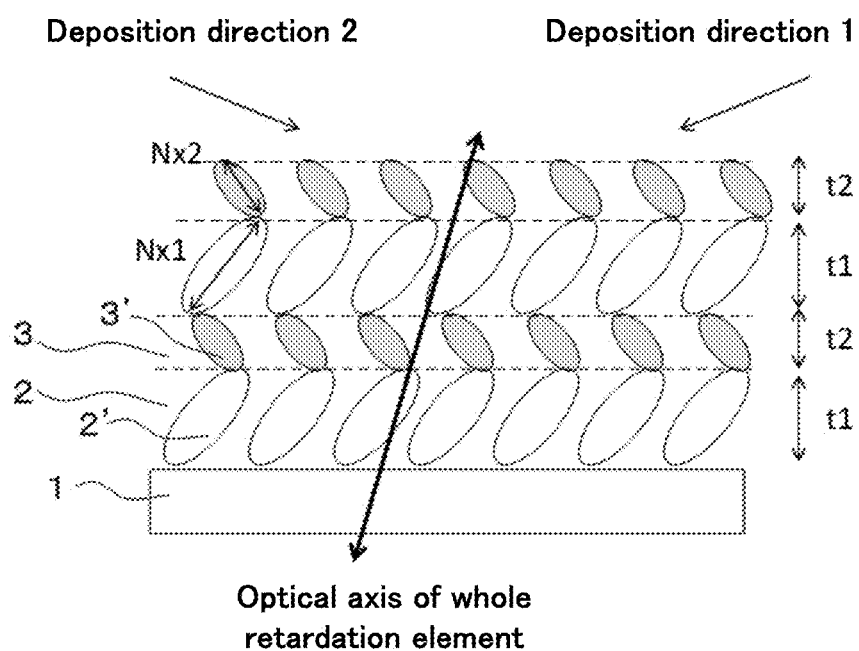
FIG. 2A is a concept diagram (x-z cross-sectional diagram) of an example of a retardation element of the present invention.
Figure 2B:
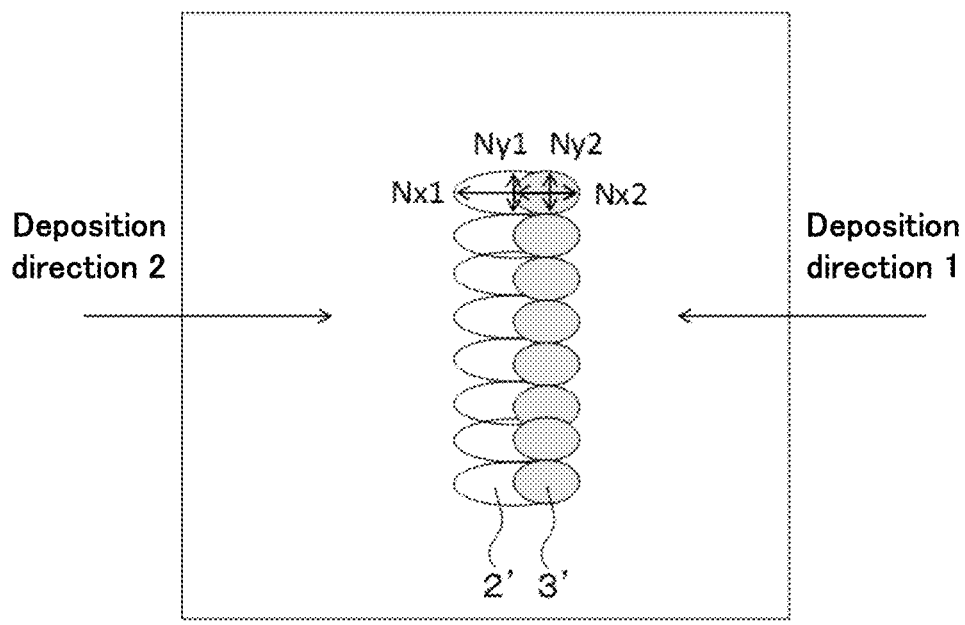
FIG. 2B is a concept diagram (x-y cross-sectional diagram) of an example of a retardation element of the present invention.
Figure 2C:
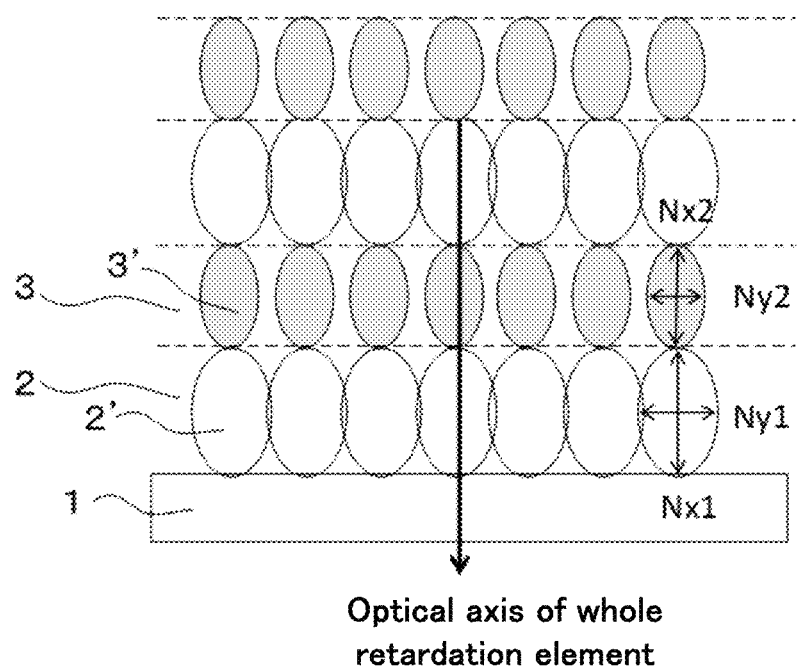
FIG. 2C is a concept diagram (y-z cross-sectional diagram) of an example of a retardation element of the present invention.
Figure 3:
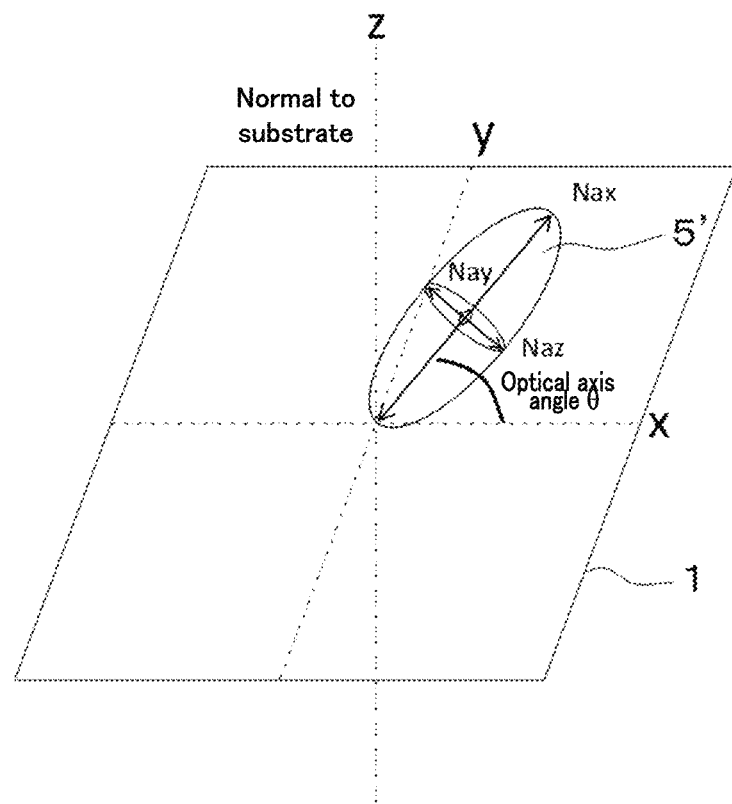
FIG. 3 is a concept diagram of an index ellipsoid approximated by the whole of birefringent layers (a birefringent multilayer structure) of the retardation element of FIG. 2A to FIG. 2C.

FIG. 2A to FIG. 2C are concept diagrams of one example of the retardation element of the present invention. FIG. 3 is a concept diagram of an index ellipsoid 5' approximated by the whole of birefringent layers (a birefringent multilayer structure) in the retardation element of FIG. 2A to FIG. 2C. FIG. 2A is a diagram showing an x-z cross-section of FIG. 3. FIG. 2B is a diagram showing an x-y cross-section of FIG. 3. FIG. 2C is a diagram showing a y-z cross-section of FIG. 3.

In the retardation element of FIG. 2A to FIG. 2C, a first birefringent layer 2, a second birefringent layer 3, a first birefringent layer 2, and a second birefringent layer 3 are stacked in this order over a transparent substrate 1. The first birefringent layers 2 are formed by oblique deposition in a deposition direction 1, and have an average thickness of t1. The second birefringent layers 3 are formed by oblique deposition in a deposition direction 2, and have an average thickness of t2. The average thickness t1 of the first birefringent layers 2 and the average thickness t2 of the second birefringent layers 3 satisfy the formula (2) described above, and $t1 \neq t2$. The first birefringent layer 2 and the second birefringent layer 3 are in a relationship that the angle ($\beta$) is 180°.

In FIG. 2A to FIG. 2C, the reference sign 2' denotes an ellipsoid of birefringence approximated by the first birefringent layers 2, and the reference sign 3' denotes an ellipsoid of birefringence approximated by the second birefringent layers 3. The reference sign Nx1 denotes the axis of Nx in the first birefringent layers 2, and the reference sign Ny1 denotes the axis of Ny in the first birefringent layers 2. The reference sign Nx2 denotes the axis of Nx in the second birefringent layers 3, and the reference sign Ny2 denotes the axis of Ny in the second birefringent layers 3.

By adjusting the average thickness t1 of the first birefringent layers 2 and the average thickness t2 of the second birefringent layers 2, it is possible to control the optical axis angle $\theta$ (the angle in the x-z plane) of the index ellipsoid approximated by the whole of the birefringent layers (the birefringent multilayer structure) while maintaining large birefringence. As a result, the optical axis of the whole retardation element can be controlled.

Figure 4A:
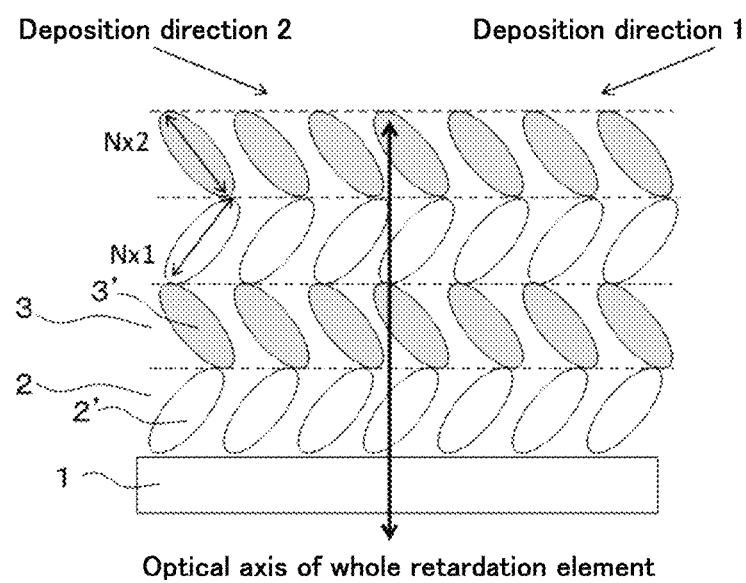
FIG. 4A is a concept diagram (x-z cross-sectional diagram) of another example of a retardation element of the present invention.
Figure 4B:
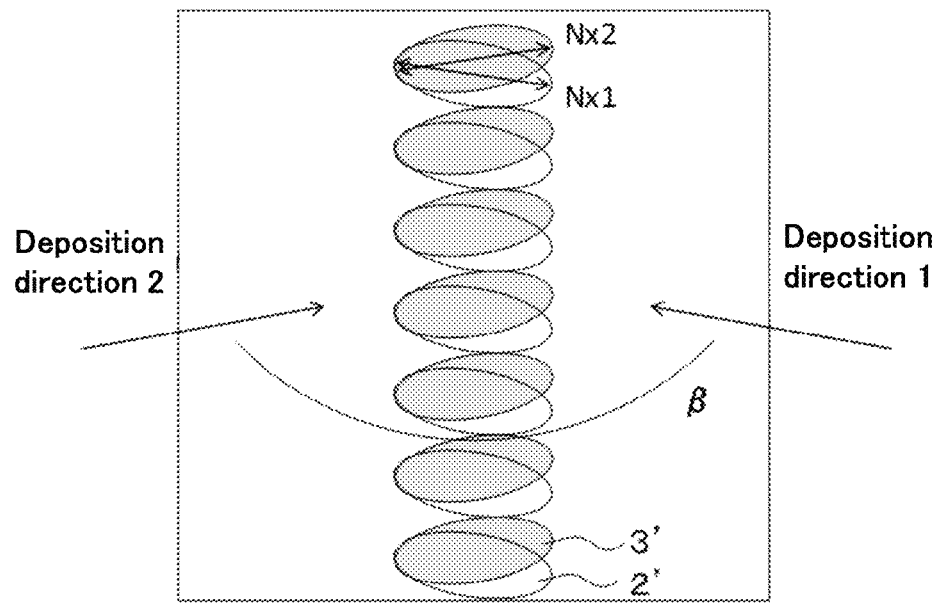
FIG. 4B is a concept diagram (x-y cross-sectional diagram) of another example of a retardation element of the present invention.
Figure 4C:
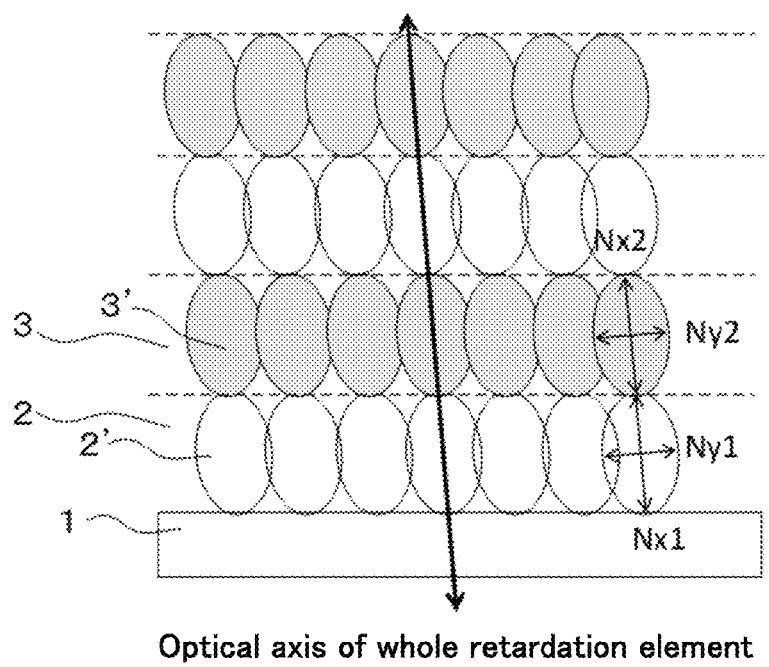
FIG. 4C is a concept diagram (y-z cross-sectional diagram) of another example of a retardation element of the present invention.
Figure 5:
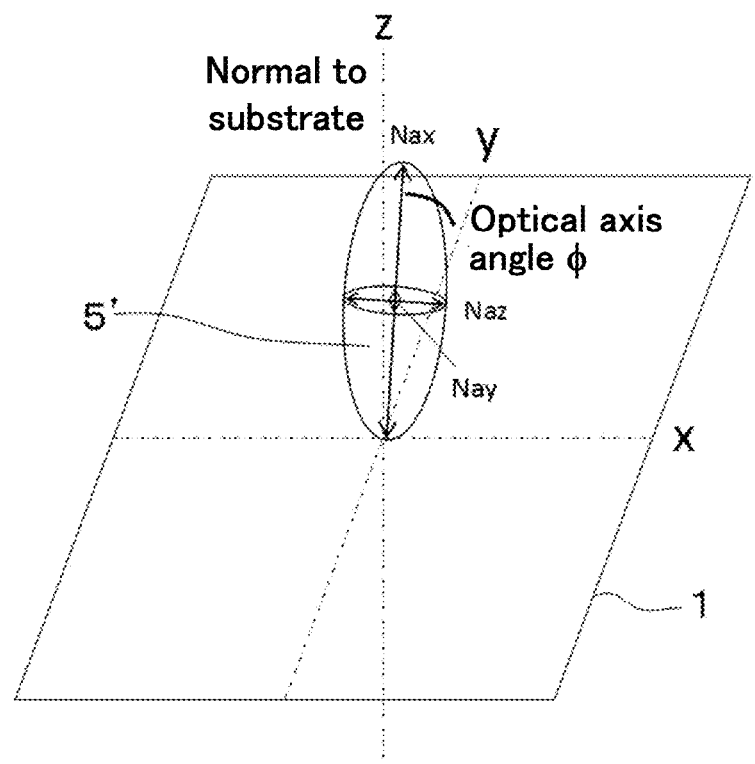
FIG. 5 is a concept diagram of an index ellipsoid approximated by the whole of birefringent layers (a birefringent multilayer structure) of the retardation element of FIG. 4A to FIG. 4C.

FIG. 4A to FIG. 4C are concept diagrams of another example of the retardation element of the present invention. FIG. 5 is a concept diagram of an index ellipsoid 5' approximated by the whole of birefringent layers (a birefringent multilayer structure) in the retardation element of FIG. 4A to FIG. 4C. FIG. 4A is a diagram showing an x-z cross-section of FIG. 5. FIG. 4B is a diagram showing an x-y cross-section of FIG. 5. FIG. 4C is a diagram showing a y-z cross-section of FIG. 5.

In the retardation element of FIG. 4A to FIG. 4C, a first birefringent layer 2, a second birefringent layer 3, a first birefringent layer 2, and a second birefringent layer 3 are stacked in this order over a transparent substrate 1. The first birefringent layers 2 are formed by oblique deposition in a deposition direction 1. The second birefringent layers 3 are formed by oblique deposition in a deposition direction 2. The average thickness of the first birefringent layers 2 and the average thickness of the second birefringent layers 3 are equal to each other. The first birefringent layer 2 and the second birefringent layer 3 are in a relationship that the angle ($\beta$) satisfies the formula (3) but is not 180°.

In FIG. 4A to FIG. 4C, the reference sign 2' denotes an ellipsoid of birefringence approximated by the first birefringent layers 2, and the reference sign 3' denotes an ellipsoid of birefringence approximated by the second birefringent layers 3. The reference sign Nx1 denotes the axis of Nx in the first birefringent layers 2, and the reference sign Ny1 denotes the axis of Ny in the first birefringent layers 2. The reference sign Nx2 denotes the axis of Nx in the second birefringent layers 3, and the reference sign Ny2 denotes the axis of Ny in the second birefringent layers 3.

It is possible to control the optical axis angle $\phi$ (the angle in the y-z plane) of the index ellipsoid approximated by the whole of the birefringent layers (the birefringent multilayer structure while maintaining large birefringence. As a result, the optical axis of the whole retardation element can be controlled.

The retardation element of the present invention is made of only inorganic materials and has high heat resistance and high light resistance, unlike the inventions described in JP-A Nos. 2005-172984 and 2007-101764 and JP-B No. 4566275. Further, the present invention can provide a retardation element having an inclined optical axis. Furthermore, the present invention can form a multilayer structure by oblique deposition unlike the inventions described in JP-A Nos. 2004-354935, 2009-133917, and 2012-078436. Therefore, the present invention can expect cost reduction, as compared with special cutting of a monocrystal, etc. Moreover, the present invention is formed of a multilayer structure and has large birefringence, unlike the invention described in APPLIED OPTICS/Vol. 28, No. 13/1 July 1989. Further, in the present invention, it is unnecessary to perform deposition while rotating the transparent substrate, unlike the invention described in U.S. Pat. No. 6,206,065, which enables simplification of the apparatus. Besides, in the present invention, it is possible to select the direction to which the optical axis is inclined.

Next, an example of a projection display device will be explained.

Figure 6:
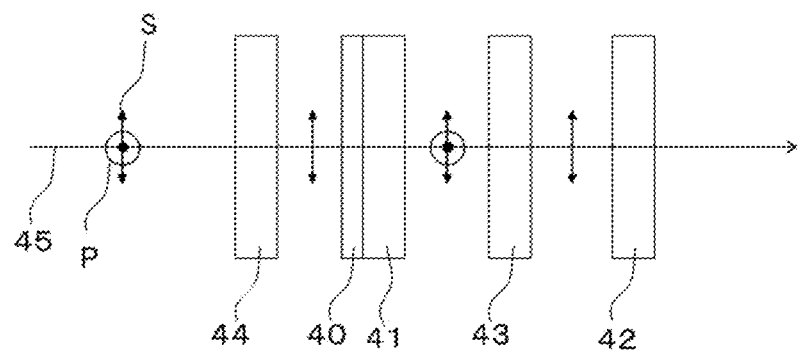
FIG. 6 is a schematic diagram showing an example of a projection display device.

FIG. 6 is a schematic cross-sectional diagram showing a configuration of a portion of an optical engine used in a projection display device. The projection display device is a transmissive liquid crystal projector that includes a transmissive polarizer 44, a vertically aligned liquid crystal layer 40, a transmissive optical modulator 41, a retardation element 43, and a transmissive polarizer 42. Here, the retardation element 43 includes a transparent substrate, a first birefringent layer, a second birefringent layer, and a retardation imparting antireflection layer. The retardation imparting antireflection layer imparts a retardation different from an oblique incident light retardation produced in the birefringent layers, and controls the value of the retardation. According to this, the birefringent layers can compensate for polarization disturbance due to the pretilt angle of the transmissive optical modulator 41, the retardation imparting antireflection layer can compensate for polarization disturbance due to oblique incident light incident to the transmissive optical modulator 41, and the retardation imparting antireflection layer can prevent reflection. This makes it possible to obtain a high contrast. In FIG. 6, the reference sign 45 denotes incident light, the reference sign P denotes P-polarized light, and the reference sign S denotes S-polarized light.

In this liquid crystal projector, light emitted from the light source is converted to plane-polarized light, then split into color light rays of R (red), G (green), and B (blue), and incident to the transmissive polarizer 44 provided for each color.

Linearly-polarized light (S-polarized light component) that transmits through the transmissive polarizer 44 is incident to the vertically aligned liquid crystal layer 40, which emits from each pixel, transmitted light modulated in the pixel. The emitted light transmits through the retardation element 43, and then transmits through or is reflected and absorbed by the transmissive polarizer 42. Light that has transmitted through the transmissive polarizer 42 is recombined through a prism into RGB light, and an image is displayed on the projection screen.

For example, in a setting for black display, S-polarized light that transmits through the transmissive polarizer 44 transmits through the vertically aligned liquid crystal layer 40 as maintained S-polarized light. However, an undesired polarized light component (P-polarized light component) also transmits because of the polarization disturbance during the transmission as described above. When there is no retardation element 43, the P-polarized light component transmits through the transmissive polarizer 42 and is displayed on the screen as light, which is a factor of degrading the black display. With the retardation element of the present invention, it is possible to improve black display, and as a result, improve the contrast of a projected image, by compensating for the polarization disturbance and reduce as much of the P-polarized light component as possible.

EXAMPLES

Examples of the present invention will now be explained below. The present invention is not limited to these Examples by any means.

Example 1

Production of Retardation Element

A deposition material mainly composed of $Ta_2O_5$ was obliquely deposited over a glass substrate (with an average thickness of 0.7 mm), (a) from a deposition source that was at 70° from a direction normal to the substrate (i.e., a direction perpendicular to a surface of the substrate) to thereby form a first birefringent layer, and then (b) from an opposite angular position that was shifted by 180° in the in-plane direction of the substrate, at the same deposition angle of 70° to thereby form a second birefringent layer. The process of (a) and the process of (b) described above were repeated alternately, to thereby form birefringent layers having a multilayer structure. After the birefringent layers were formed, an annealing treatment was performed at 200° C. for 5 hours to strip colors and vaporize moisture adsorbed between columnar structures. The birefringent layers on the whole had a film thickness of 1,500 nm. An antireflection film was formed over the back side of the substrate in order to reduce reflectivity of incident light.

Figure 7:
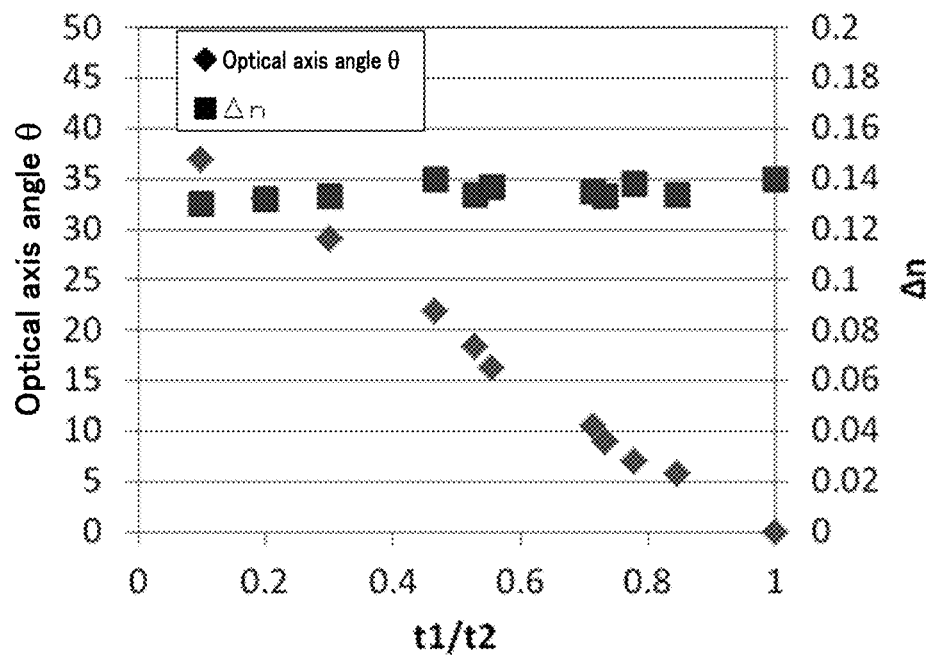
FIG. 7 is a graph showing a relationship between an average thickness of a birefringent layer, an optical axis angle, and birefringence.

A quantitative relationship among the first birefringent layer, the second birefringent layer, and the optical axis angle will be described below. FIG. 7 is a graph showing a relationship among a ratio t1/t2 between the average thickness t1 of the first birefringent layer and the average thickness t2 of the second birefringent layer, a first optical axis angle θ (an angle in an x-z plane) of an index ellipsoid approximated by the whole of the birefringent layers, and the value of birefringence produced in perpendicularly incident light incident to the birefringent layers. As shown in FIG. 7, it is possible to arbitrarily control the optical axis of the index ellipsoid by changing the ratio t1/t2. Further, even as the ratio t1/t2 is changed, there is substantially no change in the birefringence (Δn), which shows values of 0.1 or greater. This is different from the structure described in the document (APPLIED OPTICS/Vol. 28, No. 13/1 July 1989) in which Δn changes as the deposition angle, i.e., the optical axis of the index ellipsoid is changed. The present invention can control the optical axis while maintaining the birefringence to a large value. In addition, the present invention can achieve birefringence that is by far larger than birefringence of 0.07 that is obtained with a common high refractive index material such as $Ta_2O_5$.

Example 2

Production of Retardation Element

Figure 8:
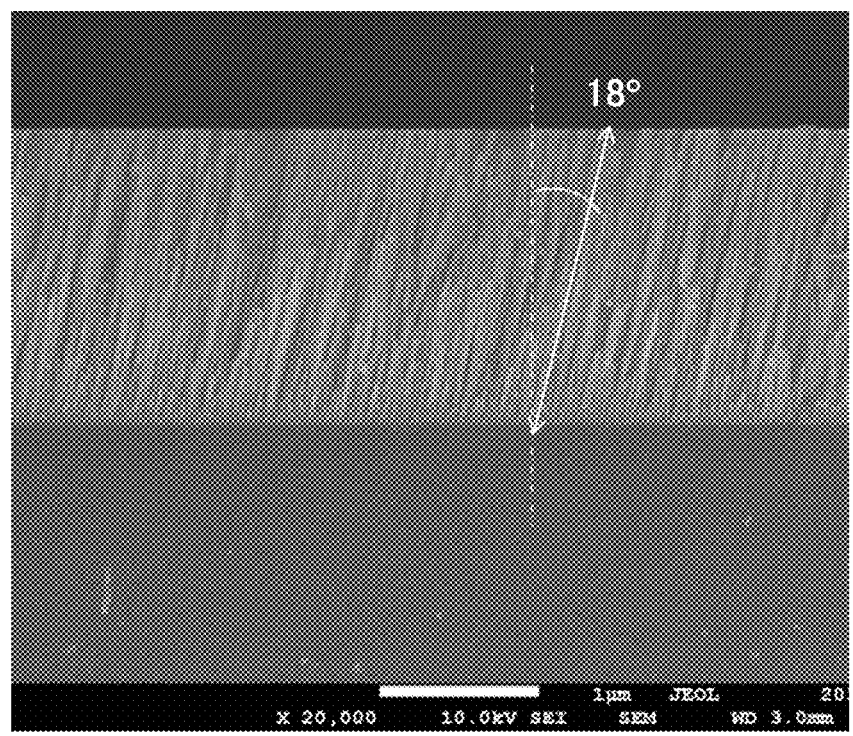
FIG. 8 is a scanning electron microscope (SEM) image of a retardation element obtained in Example 2.

A deposition material mainly composed of $Ta_2O_5$ was obliquely deposited over a glass substrate (with an average thickness of 0.7 mm), (a) from a deposition source that was at 70° from a direction normal to the substrate to thereby form a first birefringent layer, and then (b) from an opposite angular position that was shifted by 180° in the in-plane direction of the substrate, at the same deposition angle of 70° to thereby form a second birefringent layer. The process of (a) and the process of (b) described above were repeated alternately, to thereby form birefringent layers having a multilayer structure. After the birefringent layers were formed, an annealing treatment was performed at 200° C. for 5 hours to strip colors and vaporize moisture adsorbed between columnar structures. The average thickness of the first birefringent layer was 9 nm, and the average thickness of the second birefringent layer was 5 nm. The total film thickness was 2,000 nm. A SEM image is shown in FIG. 8. The optical axis was about 18°. The normal retardation for a wavelength of 550 nm was 272 nm. The birefringence was about 0.136. As apparent from this, with an embodiment of the present invention, a ½ wave plate having an inclined optical axis could be produced easily.

Example 3

Modified Example

Examples 1 and 2 can be modified in various manners according to purpose.

Figure 9A:
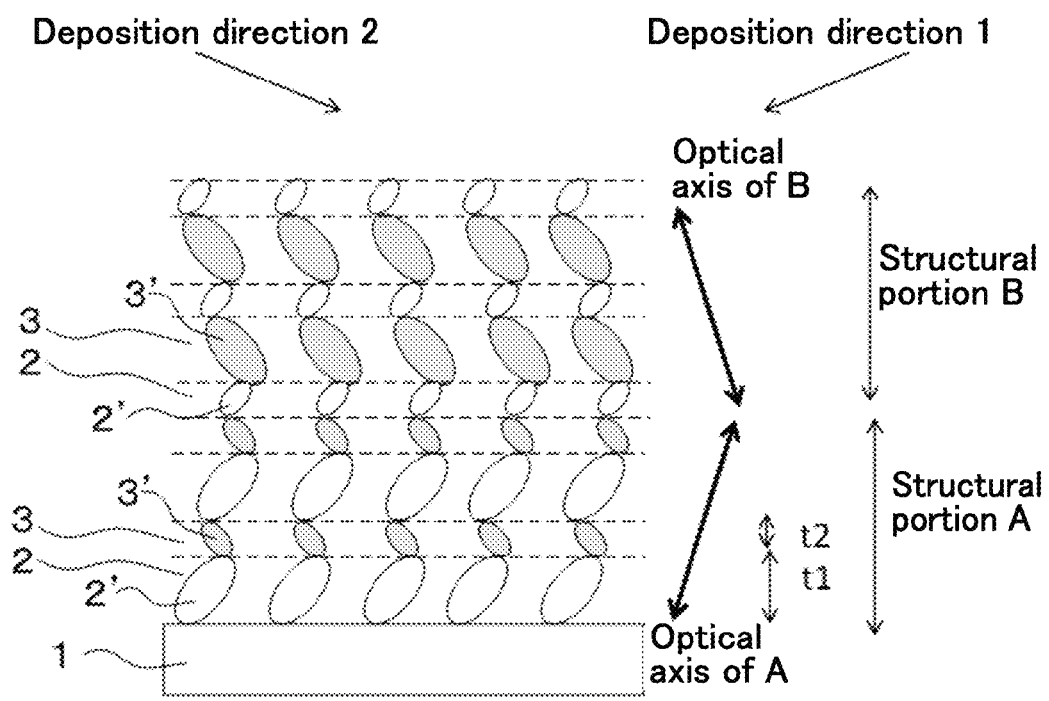
FIG. 9A is a concept diagram (cross-sectional diagram) of a retardation element obtained in Example 3.
Figure 9B:
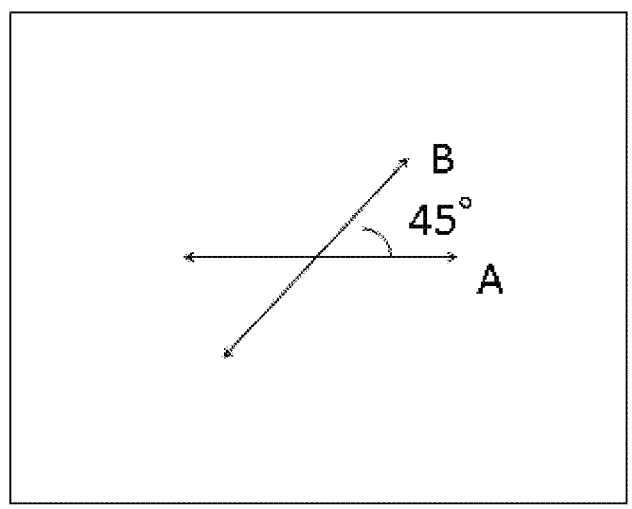
FIG. 9B is a concept diagram (plan view) of the retardation element obtained in Example 3.

A deposition material mainly composed of $Ta_2O_5$ was obliquely deposited over a glass substrate (with an average thickness of 0.7 mm), (a) from a deposition source that was at 70° from a direction normal to the substrate to thereby form a first birefringent layer, and then (b) from an opposite angular position that was shifted by 180° in the in-plane direction of the substrate, at the same deposition angle of 70° to thereby form a second birefringent layer. The process of (a) and the process of (b) described above were repeated alternately, to thereby form birefringent layers having a multilayer structure. After the birefringent layers were formed, an annealing treatment was performed at 200° C. for 5 hours to strip colors and vaporize moisture adsorbed between columnar structures. The average thickness of the first birefringent layer was 9 nm, and the average thickness of the second birefringent layer was 5 nm. When the total thickness of the plurality of first birefringent layers and the plurality of second birefringent layers reached 2,000 nm, (c) the glass substrate was rotated to an angular position shifted by 45° in the in-plane direction, and then a first birefringent layer having a thickness of 5 nm was formed, and (d) a second birefringent layer having a thickness of 9 nm was formed from an opposite angular position shifted by 180° from that angular position. The process of (c) and the process of (d) described above were repeated alternately, to thereby form birefringent layers having a multilayer structure. Exemplary views are shown in FIG. 9A and FIG. 9B. The structural portion obtained from the process of (a) and the process of (b) described above is A, and the structural portion obtained from the process of (c) and the process of (d) described above is B. According to this modified Example, a structure that is as if two wave-plates having inclined axes were stuck with each other with their in-plane axes also rotated arbitrarily can be realized easily with a single substrate. It has conventionally been necessary to cut out uniaxial wave plates such as crystals separately and stick them together, which has been considerably expensive. With the present invention, it is possible to produce a wide-range wave plate with a single substrate easily. In FIG. 9A, the first birefringent layers 2 were formed by oblique deposition in a deposition direction 1. The second birefringent layers 3 were formed by oblique deposition in a deposition direction 2. As shown in FIG. 9B, an angle formed between line segments projected on the substrate and representing the optical axis A of the structural portion A and the optical axis B of the structural portion B was 45°.

Example 4

Production of Retardation Element

A deposition material mainly composed of $Ta_2O_5$ was obliquely deposited over a glass substrate (with an average thickness of 0.7 mm), (a) from a deposition source that was set at a specific angular position at 70° from a direction normal to the substrate to thereby form a first birefringent layer, and then (b) over the glass substrate that was rotated by β° in the in-plane direction, at the same deposition angle of 70° to thereby form a second birefringent layer. Next, the substrate was rotated to be returned to the position thereof in the process of (a), and the process of (a) was performed again. The process of (a) and the process of (b) were repeated alternately to thereby form birefringent layers having a multilayer structure. The average thickness of the birefringent layers formed in the process of (a) and the process of (b) was unified to 7 nm. After the birefringent layers were formed, an annealing treatment was performed at 200° C. for 5 hours to strip colors and vaporize moisture adsorbed between columnar structures. The birefringent layers on the whole had a thickness of 1,500 nm. An antireflection film was formed over the back side of the substrate in order to reduce reflectivity of incident light.

Figure 10:
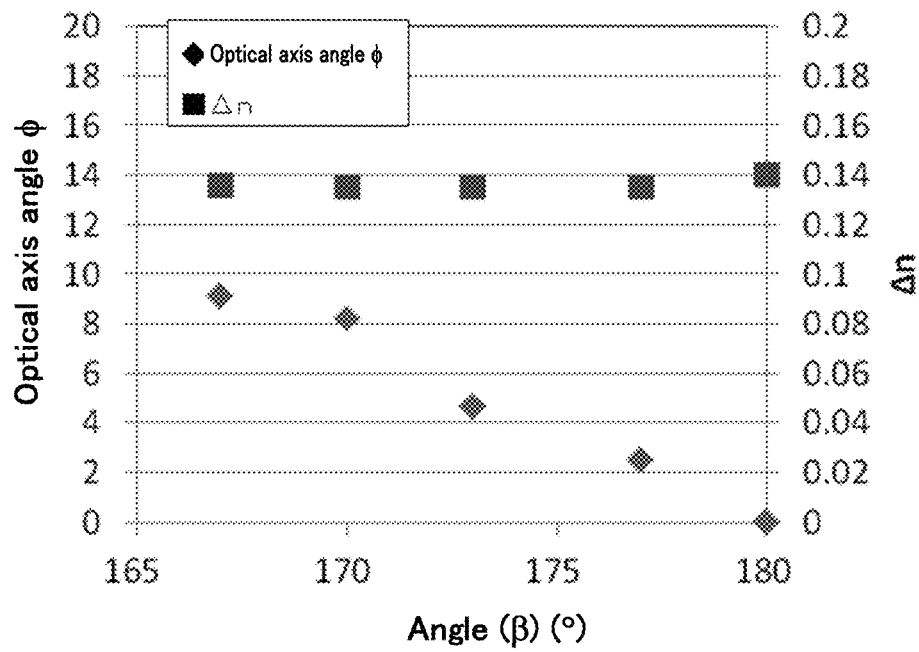
FIG. 10 is a graph showing a relationship between an angle ($\beta$), an optical axis angle $\phi$, and birefringence.

A quantitative relationship between the angle β by which the substrate is rotated in the in-plane direction of the substrate when moving from the process (a) to the process (b), and the optical axis angle will be described below. FIG. 10 is a graph showing a relationship among the angle (β), a second optical axis angle φ (an angle in the y-z plane) of an index ellipsoid approximated by the whole of the birefringent layers, and the value of birefringence produced in perpendicularly incident light incident to the birefringent layers. It was possible to arbitrarily control the optical axis of the index ellipsoid by changing the angle (β). Further, even as the angle (β) was changed, there was substantially no change in the birefringence (Δn), which showed values of 0.1 or greater. There had been no conventional oblique vapor deposition techniques for inclining the optical axis φ in the first place, and the present invention made it possible to produce a retardation element having an index ellipsoid of which optical axis φ can be inclined while maintaining practical birefringence Δn. Note that an angle β of 90° or less does not contribute to inclining of the optical axis φ. This will be explained with reference to FIG. 11A to FIG. 11C.

Figure 11A:
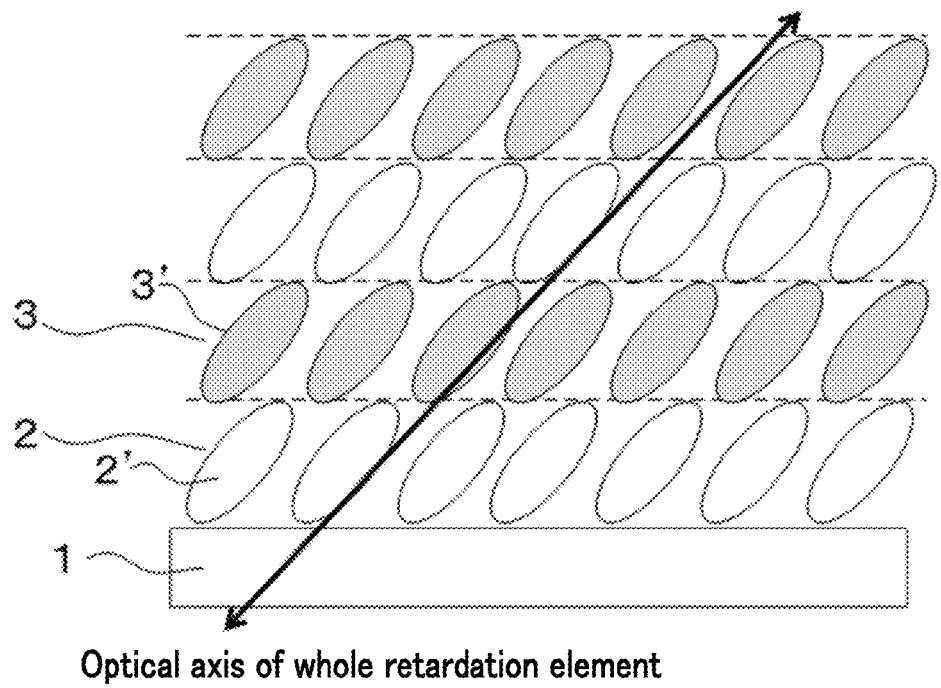
FIG. 11A is a concept diagram (x-z cross-sectional diagram) explaining changes of the optical axis angle when an angle ($\beta$) is 90° or less.
Figure 11B:
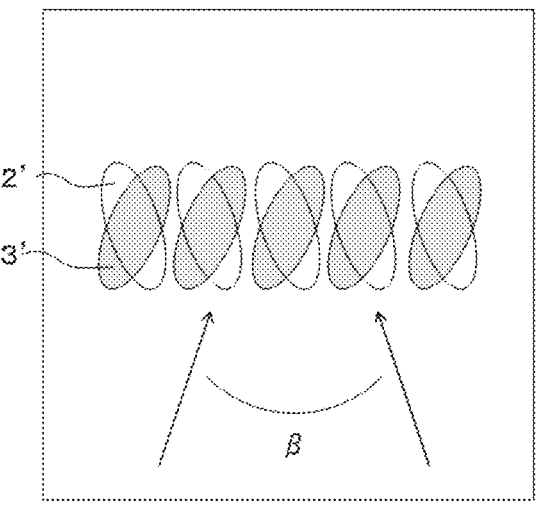
FIG. 11B is a concept diagram (x-y cross-sectional diagram) explaining changes of the optical axis angle when the angle ($\beta$) is 90° or less.
Figure 11C:
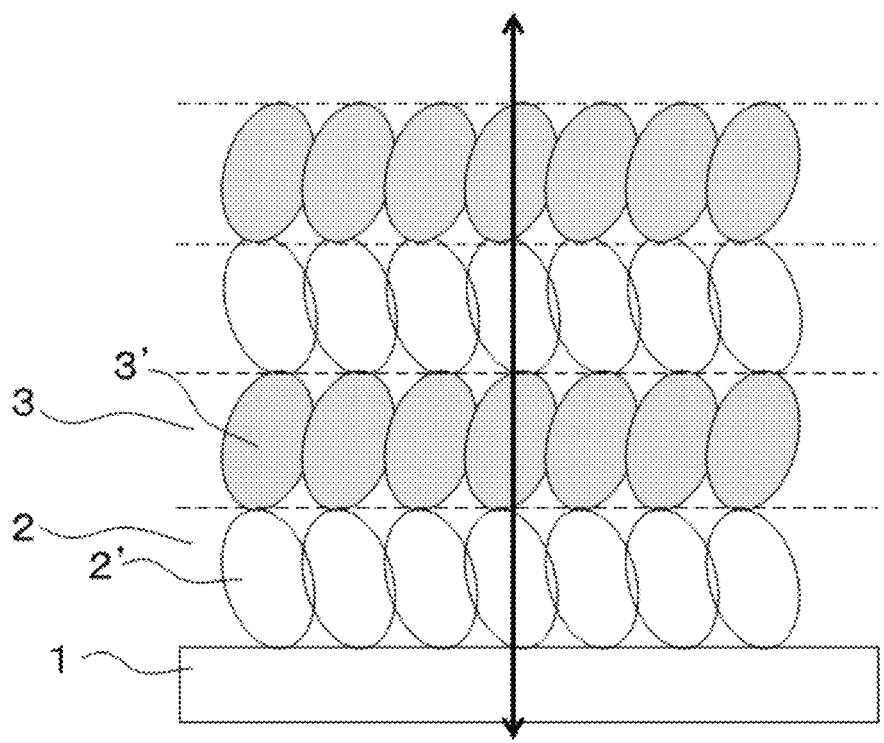
FIG. 11C is a concept diagram (y-z cross-sectional diagram) explaining changes of the optical axis angle when the angle ($\beta$) is 90° or less.

FIG. 11A to FIG. 11C are concept diagrams of an example of a retardation element. FIG. 11A is a cross-sectional diagram in an x-z plane of an x-y-z coordinate coordinate space as shown in FIG. 3. FIG. 11B is a cross-sectional diagram in an x-y plane of an x-y-z coordinate space as shown in FIG. 3. FIG. 11C is a cross-sectional diagram in a y-z plane of an x-y-z coordinate space as shown in FIG. 3.

As shown in FIG. 11A to FIG. 11C, when the angle (β) is 90° or less, the optical axes of the respective layers are averaged to make the optical axis φ coincide with the direction normal to the substrate, as apparent from particularly FIG. 11C. Further, the retardation element can only function in the same manner as when it is formed by oblique deposition from only one direction, as apparent from FIG. 11A, which would result in small birefringence. Hence, the angle β must be greater than 90°.

Example 5

Example 1 and Example 4 are methods for inclining the optical axes by different manners, respectively. However, needless to say, it is possible to control the optical axes θ and φ at the same time by combining both of them. An example will be shown below.

A deposition material mainly composed of $Ta_2O_5$ was obliquely deposited over a glass substrate (with an average thickness of 0.7 mm), (a) from a deposition source that was set at a specific angular position at 70° from a direction normal to the substrate to thereby form a first birefringent layer having an average thickness of 8 nm, and then (b) over the glass substrate that was rotated by 170° in the in-plane direction, at the same deposition angle of 70° to thereby form a second birefringent layer having an average thickness of 4 nm. Next, the substrate was rotated to be returned to the position thereof in the process of (a), and the process of (a) was performed again. The process of (a) and the process of (b) were repeated alternately to thereby form birefringent layers having a multilayer structure.

Figure 12A:
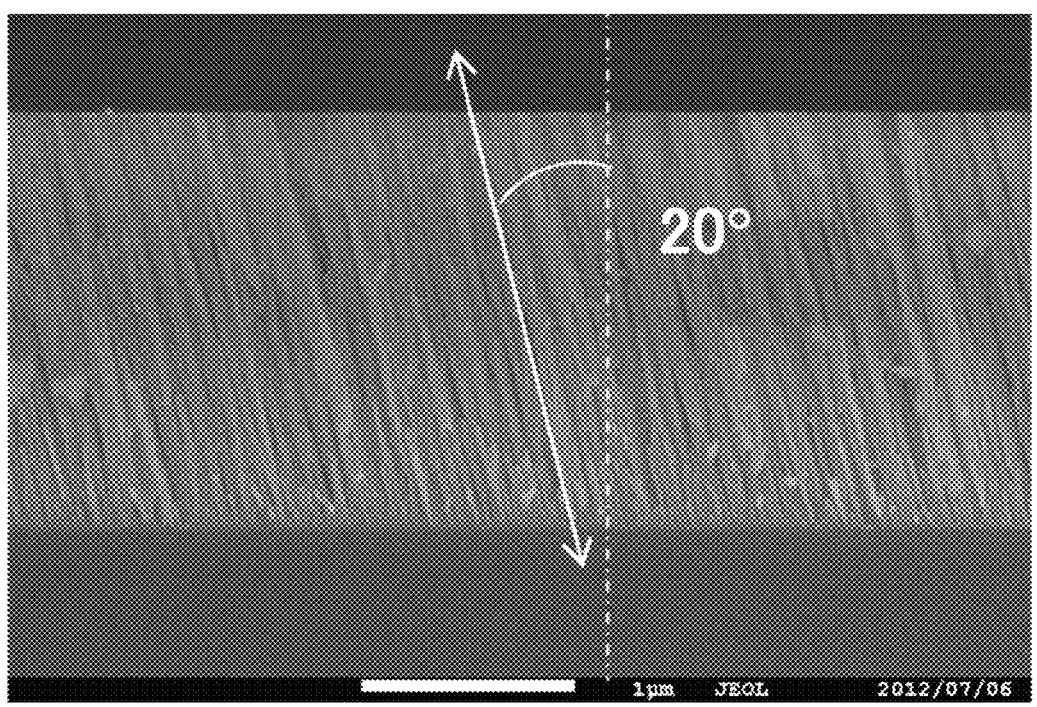
FIG. 12A is a scanning electron microscope (SEM) image of a retardation element obtained in Example 5.
Figure 12B:
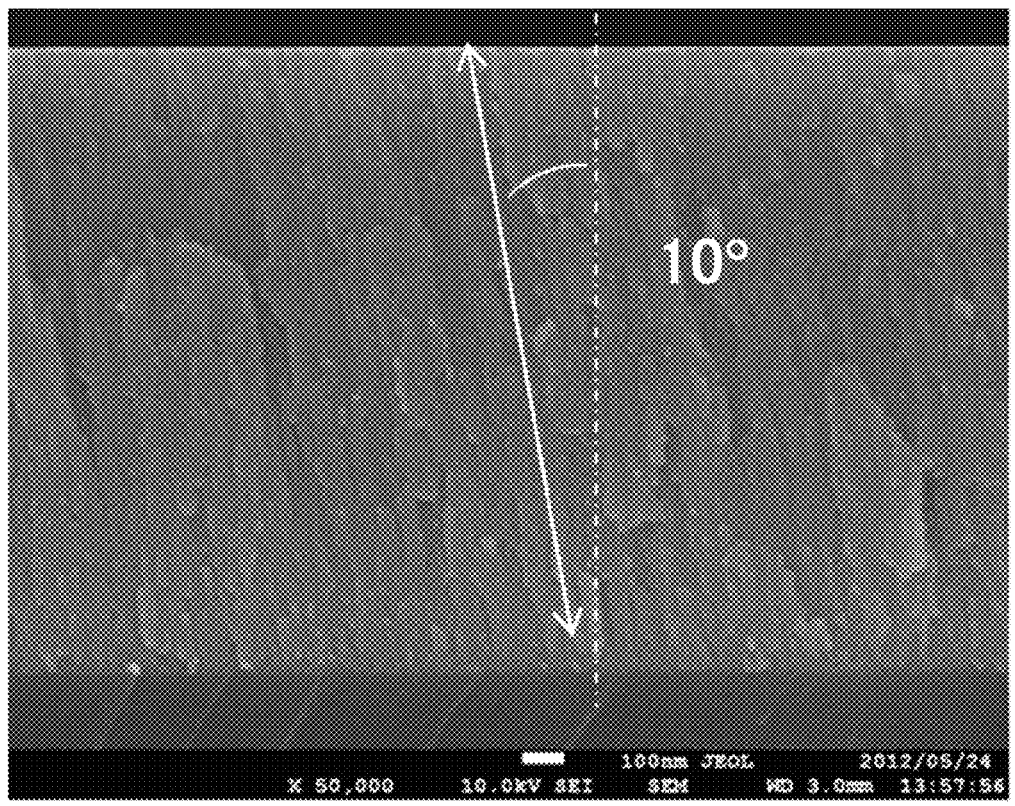
FIG. 12B is a scanning electron microscope (SEM) image of the retardation element obtained in Example 5.

SEM images of the retardation element produced in this way are shown in FIG. 12A and FIG. 12B. It can be seen that the optical axis angle θ (an angle in the x-z plane) was about 20°, and the optical axis angle φ (an angle in the y-z plane) was about 10°. In this case, the value of birefringence produced in incident light in the direction normal to the substrate was 0.14.

As described above, with the present invention, it was possible to arbitrarily control two kinds of optical axis angles while maintaining large birefringence.

Example 6

Applied Example

Figure 13A:
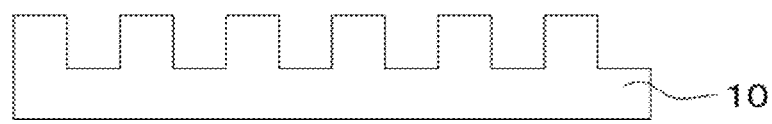
FIG. 13A is an exemplary cross-sectional diagram of a transparent substrate having a minute pattern that is equal to or shorter than a wavelength used.
Figure 13B:
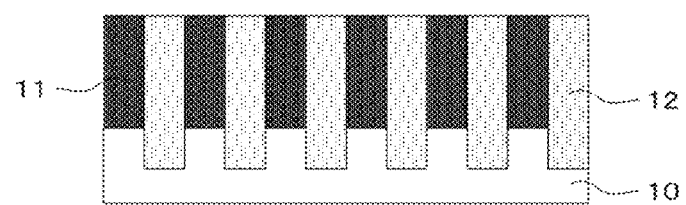
FIG. 13B is an exemplary cross-sectional diagram of another example of a retardation element of the present invention.
Figure 13C:
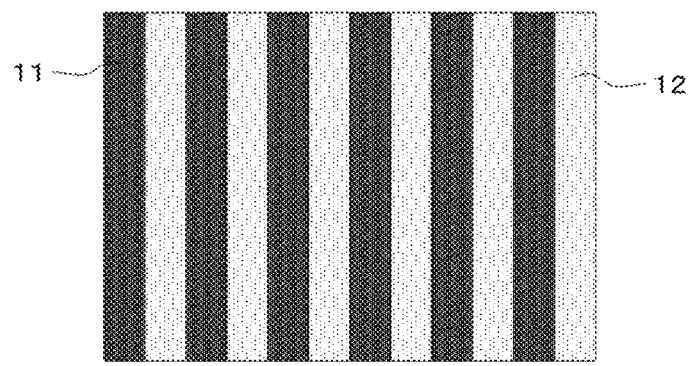
FIG. 13C is an exemplary plan view of another example of a retardation element of the present invention.
Figure 13D:
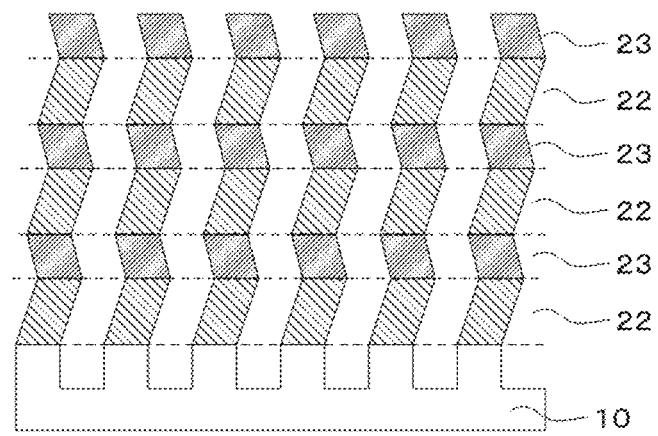
FIG. 13D is an exemplary cross-sectional diagram showing detailed structures of a first birefringent layer and a second birefringent layer of a retardation element according to another example of the present invention.

In Examples 1 to 5, obliquely deposited minute particles were applied over a flat glass substrate. However, the present inventor has found it possible to obtain a large birefringence value by depositing birefringent layers by oblique deposition over such a transparent substrate 10 as shown in FIG. 13A that has a minute pattern equal to or shorter than the wavelength to be used. An applied example is shown in FIG. 13B to FIG. 13D. FIG. 13B is an exemplary cross-sectional diagram of a retardation element. FIG. 13C is an exemplary plan view. FIG. 13D is an exemplary cross-sectional diagram showing detailed structures of a first birefringent layer 22 and a second birefringent layer 23 of a retardation element. The reference sign 11 denotes a high refractive index portion made of an optically anisotropic inorganic material. The reference sign 12 denotes a low refractive index portion made of air. $Ta_2O_5$ in which $TiO_2$ was added was vertically deposited over a glass substrate having a one-dimensional lattice having a pitch of 150 nm and a depth of 50 nm from a deposition source that was set perpendicularly to the lattice lines and at 70° from a direction normal to a surface of the substrate. The amount of birefringence was 2.8 times as large as that obtained by conventional oblique deposition. This made it possible to reduce the film thickness from a conventionally required thickness in order to obtain a desired retardation characteristic. The reduction in the film thickness has many advantages such as acceleration and streamlining of the production process, reduction in the costs of materials used for the film formation, etc. The reason why a large birefringence value was obtained by forming films over a pattern is considered to addition of a structural birefringent effect based on the intervals between the lattice lines. The material of the low refractive index portion is not particularly limited to air, and an arbitrary material may be selected according to the purpose as long as it has a refractive index lower than that of the optically anisotropic inorganic material of the high refractive index portion. In this applied example, a one-dimensional lattice was used. However, the pattern may be a random pattern, or a pattern formed by a pattern forming method using a block copolymer described in the document (Toshiba Review Vol. 60, No. 10, 2005) (i.e., a method of forming a film of $SiO_2$ over a glass substrate in the same manner as described above, and forming a pattern using a block copolymer, and transferring the pattern of the block copolymer to $SiO_2$), as long as such a pattern is shorter than the wavelength range to be used. With the retardation element of the present invention, it is possible to arbitrarily incline the optical axis of even a wave plate formed in this way.

By combining a substrate pattern and obliquely deposited films as shown in FIG. 13B to FIG. 13D, it is possible to obtain a larger amount of birefringence and make the total film thickness smaller.

What is claimed is:

1. A retardation element, comprising:
    a transparent substrate; and
    a birefringent multilayer structure formed of a plurality of layered structures stacked over the transparent substrate and each formed of a first birefringent layer that comprises an optically anisotropic inorganic material and a second birefringent layer that comprises an optically anisotropic inorganic material and contacts the first birefringent layer,
    wherein in at least one of the layered structures, a relationship between an average thickness (t1) of the first birefringent layer and an average thickness (t2) of the second birefringent layer satisfies any of the formulae (1) and (2) below,
    wherein in the at least one of the layered structures, an angle (β) formed between a first line segment representing a principal axis of refractive index anisotropy of the first birefringent layer and a second line segment representing a principal axis of refractive index anisotropy of the second birefringent layer satisfies the formula (3) below when the first line segment and the second line segment are projected on the transparent substrate such that an end A of the first line segment at a side of the transparent substrate and an end B of the second line segment at a side of the transparent substrate coincide with each other, and
    wherein the at least one of the layered structures satisfies the condition (4) below, $0 < t1/t2 \leq 1$  formula (1)

$0 < t2/t1 \leq 1$  formula (2)

$90° < \beta \leq 180°$  formula (3)

$t1 \neq t2$ or $\beta \neq 180°$  condition (4).

2. The retardation element according to claim 1, wherein the retardation element has birefringence of 0.1 or greater in a direction perpendicular to a surface of the transparent substrate.

3. The retardation element according to claim 1, wherein the retardation element is a biaxial retardation element, and
    wherein a direction of an optical axis of the retardation element is inclined from a direction perpendicular to a surface of the transparent substrate to a direction x in which a direction of a principal axis of refractive index anisotropy of the birefringent multilayer structure is represented when an index ellipsoid approximated by the birefringent multilayer structure is projected on the transparent substrate, or to a direction y perpendicular to the direction x over the transparent substrate, or to the direction x and the direction y.

4. The retardation element according to claim 1, wherein the first birefringent layer, or the second birefringent layer, or both thereof satisfy the following formula: Nx>Ny>Nz, where Nx represents a refractive index in a direction parallel with the principal axis of refractive index anisotropy, Ny represents a refractive index in a direction perpendicular to Nx, and Nz represents a refractive index in a direction perpendicular to Nx and Ny.

5. The retardation element according to claim 1, wherein an index ellipsoid approximated by the birefringent multilayer structure satisfies the following formula: Nax>Nay>Naz, where Nax represents a refractive index of the index ellipsoid approximated by the birefringent multilayer structure in a direction parallel with a principal axis of refractive index anisotropy thereof, Nay represents a refractive index thereof in a direction perpendicular to Nax, and Naz represents a refractive index thereof in a direction perpendicular to Nax and Nay.

6. The retardation element according to claim 1, wherein the at least one of the layered structures has an average thickness of 30 nm or less.

7. The retardation element according to claim 1, wherein the optically anisotropic inorganic material of the first birefringent layer is an oxide that comprises Si, Nb, Zr, Ti, La, Ta, or Al, or any combination thereof, and
    wherein the optically anisotropic inorganic material of the second birefringent layer is an oxide that comprises Si, Nb, Zr, Ti, La, Ta, or Al, or any combination thereof.

8. A liquid crystal display device, comprising:
    a liquid crystal panel; and
    the retardation element according to claim 1.

9. A projection display device, comprising:
    a light source configured to emit light;
    a projection optical system configured to project modulated light; and
    the liquid crystal display device according to claim 8 disposed on an optical path between the light source and the projection optical system.

10. A method for producing the retardation element according to claim 1, comprising:
    forming the first birefringent layer over the transparent substrate by oblique deposition; and
    forming the second birefringent layer over the first birefringent layer by oblique deposition.

* * * * *